July 15, 1958

G. M. WOODRUFF 2,843,080

POPCORN FLAVORING APPARATUS

Filed Aug. 2, 1955

2 Sheets-Sheet 1

INVENTOR

George M. Woodruff.

BY Cameron, Kerkam & Sutton

ATTORNEYS

July 15, 1958

G. M. WOODRUFF 2,843,080

POPCORN FLAVORING APPARATUS

Filed Aug. 2, 1955

2 Sheets-Sheet 2

INVENTOR

*George M. Woodruff.*

BY
*Cameron, Kerkam & Sutton*
ATTORNEYS

United States Patent Office 2,843,080
Patented July 15, 1958

2,843,080
POPCORN FLAVORING APPARATUS

George M. Woodruff, Battle Creek, Mich., assignor to General Foods Corporation, New York, N. Y., a corporation of Delaware Application August 2, 1955, Serial No. 525,984

4 Claims. (Cl. 118—16)

This invention relates to popcorn flavoring apparatus and more particularly to such apparatus which may be installed on existing popcorn machines for treating the popcorn after popping to impart to the popcorn any desired flavor, condimets, or oil or any combination of flavoring materials.

Heretofore it has been proposed to drop the popcorn by gravity onto a rotating disc beneath the popping machine and to supply to this disc salt, pepper, or oils or combinations of these condiments to coat the popcorn as it rotates on the disc. Such apparatus is shown in the patent to Booth No. 1,332,023 and the apparatus of the present invention is an improvement thereon.

It is accordingly an object of the present invention to provide novel apparatus for use with popcorn machines in which the popped corn falls by gravity onto a rotating disc, is guided on the disc during its rotation and discharged therefrom by suitable guide means, and during travel on the disc the popped corn is flavored by gravity discharge onto the popped corn of condiments such as pepper, salt and oil and other flavoring materials, such as caramel, as may be desired.

Another object is to provide such novel apparatus which is compact and which can be readily installed on existing popcorn machines at modest cost.

Another object is to provide such apparatus which is relatively cheap and easy to manufacture and to install and which requires minimum service.

Other and further objects of the present invention will appear from the following description of an illustrative embodiment thereof.

The present invention is capable of various mechanical expressions and this illustrative embodiment thereof should in no way be construed as defining or limiting the same. Reference should be had to the appended claims to determine the scope of the present invention.

Figure 1:
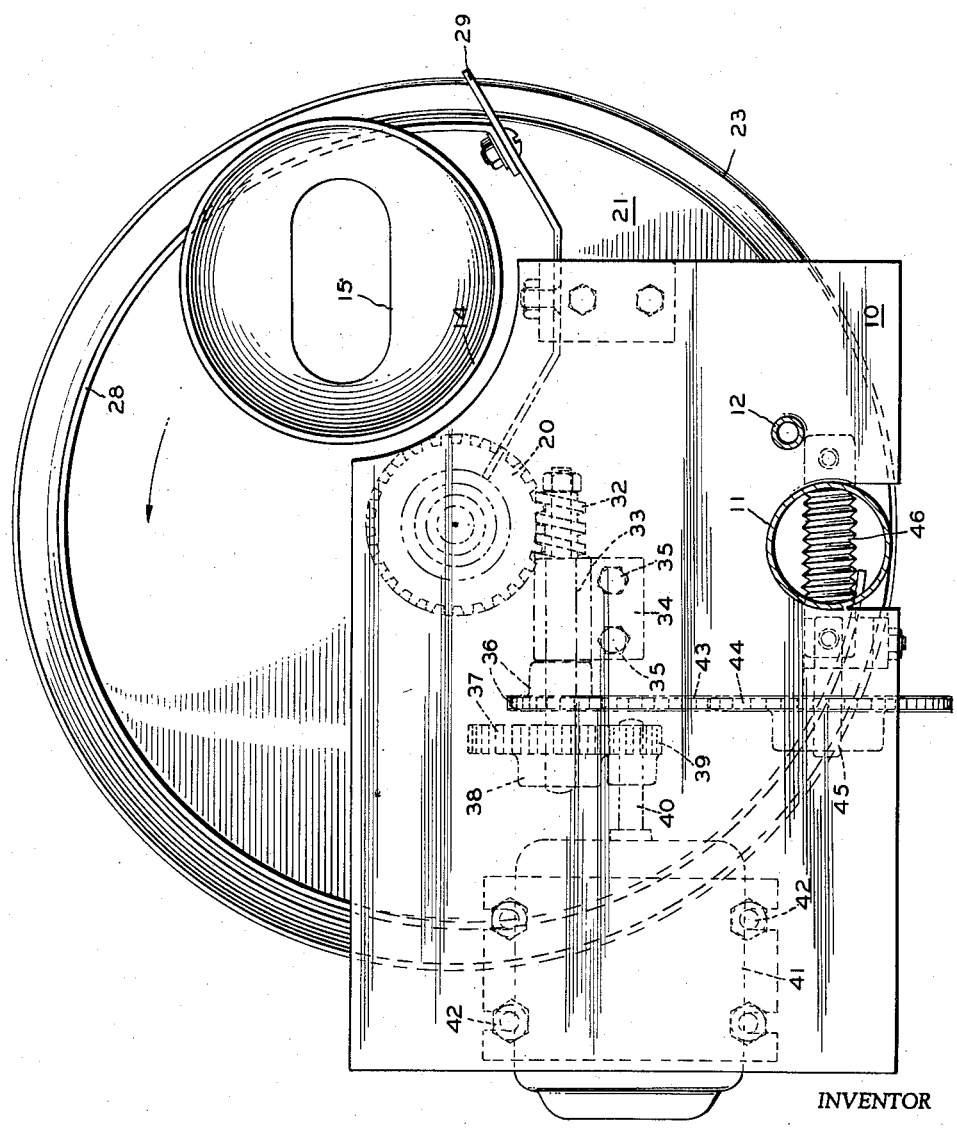
Figure 2:
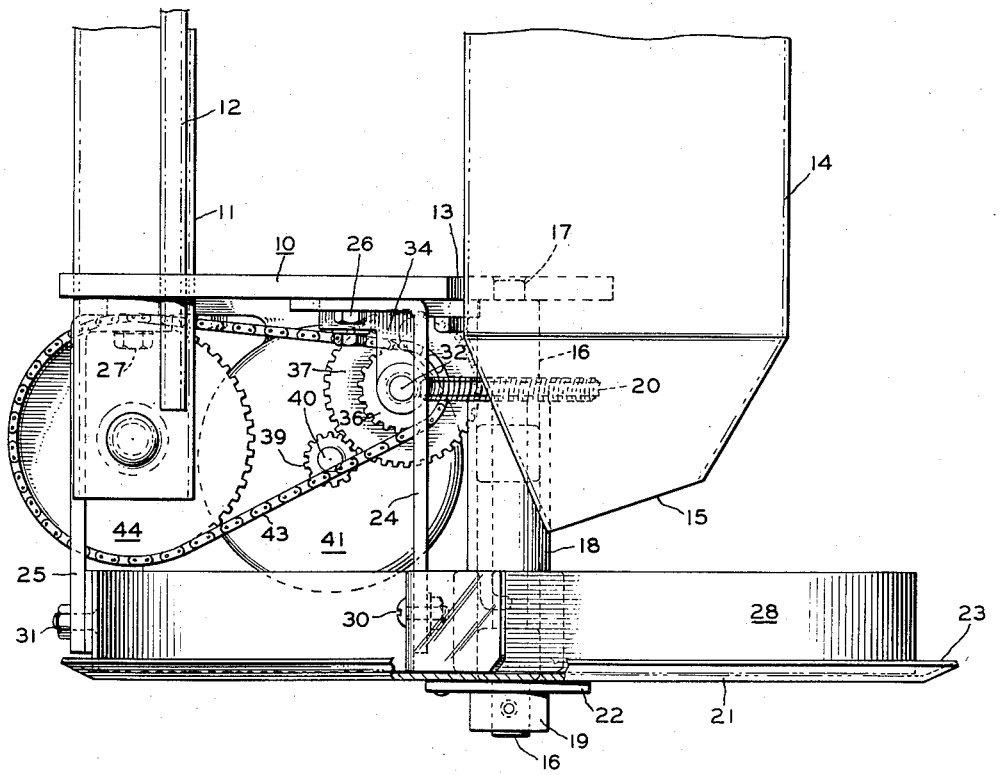

In the accompanying drawings, in which like reference characters indicate like parts, Fig. 1 is a view from above of an illustrative embodiment of the present invention showing the relative position of the several parts thereof and the structure for supporting the same; and Fig. 2 is a view from the right of the embodiment of Fig. 1 to show in elevation the arrangement of the several component parts.

Referring now to the drawings, a base plate 10 is provided through which passes a hollow cylindrical tube 11 which is suitably secured to base plate 10 and may act as a means for securing the apparatus of the present invention beneath a conventional popcorn machine. Tube 11 also has another function in the distribution of condiments over the popcorn as will more fully appear hereinafter. A second tube 12 also passes through plate 10 and is arranged adjacent to tube 11. Tube 12 acts as a conduit for oil or other liquid condiment or flavor to be distributed over the popcorn. Plate 10 is cut away at 13 to receive conduit 14 which terminates in a restricted mouth 15. Conduit 14 receives popped corn from the popcorn machine and restricted mouth 15 is arranged to spread the popped corn in a band around the periphery of the rotating disc, as will more fully appear hereinafter.

A suitable shaft or spindle 16 extends vertically downward from plate 10 and is secured thereto as at 17. A second sleeve shaft 18 is mounted for rotation on shaft 16 and is prevented from longitudinal movement with respect thereto as by nut 19. A worm gear 20 is secured to and rotates shaft 18. A circular plate 21 is secured at its center to shaft 18 as by disc 22 for rotation therewith. Plate 21 is provided with a circumferentially extending upstanding rim 23. Brackets 24 and 25 are suitably secured to plate 10 as at 26 and 27, respectively, and at their lower ends support a fence 28 which extends partially circumferentially around plate 21 within rim 23. Fence 28 is provided with a deflecting discharge plate 29, fence 28 being secured to brackets 24 and 25 at 30 and 31 respectively.

Worm gear 20 is driven by worm 32 which is mounted for rotation on shaft 33 which in turn is mounted in a suitable bearing 34 secured to plate 10 by bolts 35. Shaft 33 carries a sprocket 36 and is rotated by gear 37 which is suitably secured thereto as by nut 38. Gear 37 is driven by gear 39 which is mounted for rotation on motor shaft 40 which in turn is rotated by electric motor 41. Motor 41 is secured beneath plate 10 as by bolts 42.

A suitable chain 43 is mounted on sprocket 36 and drives sprocket 44. Drive sprocket 44 in turn rotates shaft 45 which passes through tube 11 adjacent the bottom thereof and at right angles to its long axis. A suitable worm or auger 46 is mounted on shaft 45 in tube 11 for rotation with shaft 45. The additional function of tube 11, as referred to above, is as a reservoir for powdered condiment such as salt, pepper, other spices, or powdered flavoring material as may be desired and when shaft 45 and auger 46 are rotated this powdered condiment will be fed out of tube 11 and scattered over the popped corn rotating beneath pipe 11 on plate 21.

The operation of the apparatus of the present invention should now be apparent. With popped corn falling into conduit 14 from the popping apparatus and being distributed by outlet 15 adjacent the periphery of plate 21, motor 41 is energized and plate 21 is rotated through shaft 40, gears 39 and 37, shaft 33, worm 32, worm gear 20 and shaft 18. The popcorn falls on plate 21 in a more or less restricted band which is prevented from spilling over the edge 23 of plate 21 by fence 28. Actuation of motor 41 also drives the condiment auger 46 through sprocket 36, chain 43, sprocket 44, and shaft 45 so that any popcorn passing beneath the lower end of tube 11 has the desired flavoring material sprinkled on it. Tube 12, as noted above leads from a source of liquid flavoring material such as oil and the like and the popcorn passing beneath tube 12 receives a coating of this liquid flavoring material. After the popcorn has passed tube 12 it comes into contact with deflection plate 29 and spills over the rim 23 of plate 21 into a receiver (not shown) where it may be retained until sold.

It should now be apparent that the present invention provides novel popcorn flavoring apparatus which in every way satisfies the several objectives described above.

Changes in or modifications to the above described illustrative embodiment of this invention may now be suggested to those skilled in the art without departing from the present inventive concept. Reference should therefore be had to the appended claims to determine the scope of this invention.

What is claimed is:
1. In popcorn flavoring apparatus, a base, a plate mounted for rotation beneath said base on a substantially vertical axis, a fence carried by said base and extending around and adjacent the edge of said plate, a discharge extension on said fence, means for feeding popped corn onto said plate adjacent the edge thereof and within said fence, means for dropping powdered flavoring material and liquid flavoring material onto the popped corn on and rotating with said plate, rotatable feeding means for said powdered flavoring material, means for rotating said plate, and means driven by said plate rotating means for driving said powdered flavoring feeding means.

2. Apparatus as described in claim 1 in which said feeding means for powdered flavoring material includes a tube extending through said base to pass the flavoring material to the popped corn, and a feeding auger extending substantially transverse to the flow of flavoring material through the lower end of said tube above said plate, said auger being rotated from said plate rotating means and having a substantially helical peripheral groove.

3. Apparatus as described in claim 1 in which said plate rotating means includes an electric motor, mounted on said base, a gear rotated by said electric motor, a stub shaft rotatably mounted on said base, a gear on said stub shaft engaging said first gear, a worm rotated by said stub shaft and a worm gear driven by said worm and mounted on said shaft and connected to said plate.

4. Apparatus as described in claim 3 in which said powdered flavoring feeding means includes a tube extending vertically through said base to pass the flavoring material, a feeding auger extending through the lower end of said tube above said plate substantially transverse to the flow of flavoring material, said auger being mounted for rotation and having a substantially helical peripheral groove, a sprocket driving said auger, a sprocket on stub shaft and a chain connecting said sprockets.

References Cited in the file of this patent

UNITED STATES PATENTS

| 912,102 | Ferguson | Feb. 9, 1909 |
| 1,251,304 | Tripp et al. | Dec. 25, 1917 |
| 1,545,357 | Schwimmer | July 7, 1925 |
| 1,664,474 | Bailey | Apr. 3, 1928 |
| 2,549,449 | Gibson | Apr. 17, 1951 |